Nov. 12, 1935.  R. J. PARSONS ET AL  2,020,474
THERMOSTATIC CIRCUITS
Filed Oct. 25, 1932
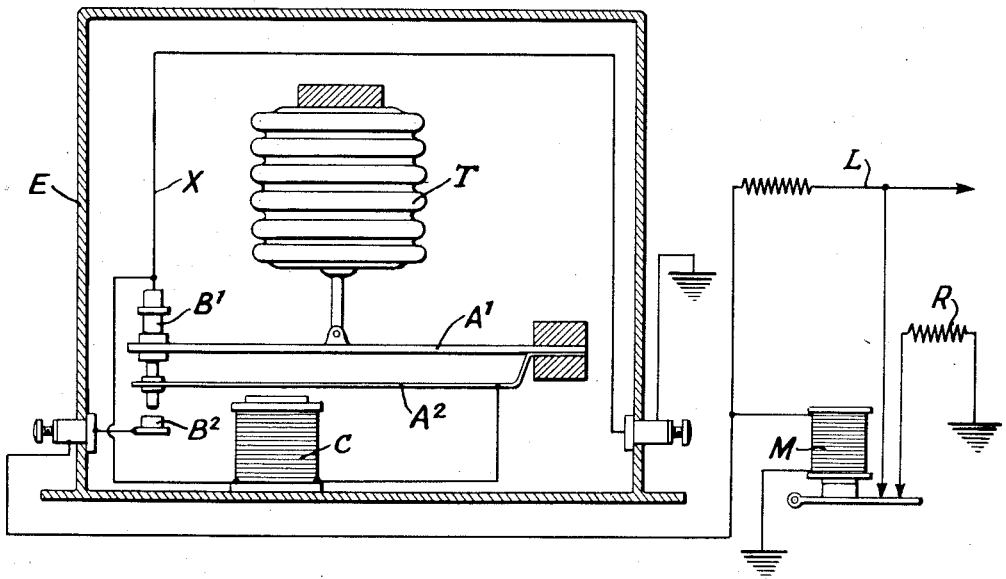
INVENTORS
Robert J. Parsons
Ernest J. Heyman
Edward M. Bentley
ATTORNEY Patented Nov. 12, 1935

2,020,474

UNITED STATES PATENT OFFICE 2,020,474

THERMOSTATIC CIRCUITS

Robert J. Parsons, Schenectady, and Ernest J. Heyman, Hampton Manor, N. Y., assignors to Consolidated Car-Heating Company, Inc., Albany, N. Y., a corporation of New York Application October 25, 1932, Serial No. 639,496

4 Claims. (Cl. 200—140)

For a detailed description of the present form of our invention, reference may be had to the following specification and to the accompanying drawing forming a part thereof.

In our application filed October 31, 1931, Serial No. 572,360, we have shown and described a thermostat for automatically controlling an electric car heater.

The present invention involves certain modifications of the one shown in said application. In particular we have encountered difficulty in enclosing the metal thermostat which said application shows. The said enclosure has acted to so change the sensitivity of the instrument that it will not act within the desired limit of differential.

To remedy this trouble we have now utilized a bellows which serves as a mechanical form of thermostat. This will, we have discovered, operate within the desired differential even if enclosed. Also it is unaffected by vibrations, unless they are very violent. Even violent vibrations tend to decrease the differential instead of increasing it, which is not objectionable. While this newly discovered function of a bellows is the principal feature of our present invention, it also entails a somewhat different connection which we also include in the present application.

Referring to the drawing, in a casing E, $A^1$ is a non-magnetic strip mounted at its right hand end and operated by a bellows T. Just below $A^1$ and mounted therewith is a very thin and flexible magnetic strip $A^2$ subject to a thermostat magnet C. The condition shown in the drawing is that in which the heat is on, the circuit of the heater R being held closed in a branch from line L controlled by the switch magnet M, and the thermostat being at that time disconnected at fixed contact $B^2$. As the car warms up the temperature will expand bellows T and push $A^1$ away from the fixed grounded contact $B^1$. A little further expansion of the bellows will close strip $A^1$ against the thin metallic strip $A^2$ and the contact $B^2$. The circuit will then be closed at the thermostat from $B^2$ to $A^2$, thence through from $A^2$ to thermostat magnet C, to line X and the ground. That will short-circuit the magnet M of the switch through the said thermostat magnet C and the switch will open, but the magnet C, being now energized, will continue to hold strip $A^2$ down.

As the car cools, the bellows T will contract. The strip $A^1$, which is non-magnetic and therefore not held down by the thermostatic magnet C, will rise, while $A^2$, which is magnetic, will still be held by magnet C, until $A^1$ again hits $B^1$. When this occurs C is short-circuited, because the current fom $B^2$ will go directly to $B^1$ by means of $A^1$ and to ground-wire X, instead of going from $A^2$ through magnet C to the ground-wire X. Since magnet C is now de-energized, $A^2$ will spring away from $B^2$ and open the aforesaid short-circuit from $B^2$ around magnet M of the switch and the switch will close and energize the heater.

In brief the line L constitutes a main circuit provided with two branch circuits, one of said branch circuits including the magnetic switch M, and the other branch circuit including the fixed contacts $B'$ and $B^2$. It will also be noted that the circuit which includes the magnet C and its armature is connected to the wire X between contact $B'$ and the ground, so as to by-pass said contact. Therefore, the heater circuit is controlled by its own switch magnet M and the thermostat controls magnet M by merely opening or closing a short-circuit containing a magnet C whose armature $A^2$ is manipulated by the bellows which the temperature controls. The bellows action is non-electric although it pushes armature $A^2$ into the grasp of magnet C which it also energizes by closing its circuit at $B^2$. Magnet C then holds the armature $A^2$ thus pushed by the bellows into its grasp, until it is finally short circuited by engagement of the strip $A^1$ with contact $B^1$ to make it release $A^2$. By this means the bellows acts mechanically on the electrical devices—circuit-closer and magnet—to give the electrical results which are secured by the thermal strips of the aforesaid application Serial No. 527,360. The bellows is shown enclosed by the casing E which does not affect the bellows, although it seriously did effect the metal-strip thermostat shown in the application aforesaid.

What we claim as new and desire to secure by Letters Patent is:

1. Means for controlling a thermostat circuit comprising a control device consisting of two electro-conductive members electrically connected at one end but having their other ends free and relatively movable, contacts carried by said free ends, fixed contacts complemental to the first mentioned contacts, a thermostat spaced from the control members and connected with one of them in such manner as to move its contact toward and from one of said fixed contacts, and to move the other member away from the other fixed contact, and electro-magnetic means for temporarily holding the last mentioned member in temporary engagement with its fixed contact during return movement of the thermostatically connected member toward its fixed contact.

2. Means for controlling a thermostat circuit comprising a control device consisting of two electro-conductive members electrically connected abutting portions at one end but free and relatively movable at their other ends, contacts carried by the respective movable ends, fixed contacts complemental to the first mentioned contact, a thermostat element structurally independent of both of said electro-conductive members, means positively connecting said thermostat element with one of the said electro-conductive members of the control device in such manner as to move the contact carried thereby toward and from one of said fixed contacts, and to move the other member away from the other fixed contact, an electro-magnet adjacent the last mentioned member for holding it in temporary engagement with its fixed contact, and a circuit including the last mentioned member and said magnet and so arranged as to by-pass the fixed contact of the first mentioned member.

3. Means for controlling a thermostat circuit comprising a control device consisting of two members one of which is rigid and the other resilient, both members being thermally conductive and electrically connected at one end so as to be free and relatively movable at their other ends, contacts carried by said free ends, fixed contacts complemental to the contacts carried by said members, a thermostat positively connected with the rigid member in such manner as to move it toward and from one of said fixed contacts, and to move the resilient member away from its fixed contact, an electro-magnet so arranged as to attract said resilient member and hold it in temporary engagement with the other fixed contact during return movement of the rigid member toward its fixed contact.

4. Control means for a thermostat circuit comprising two strips having parallel abutting portions at one end and offset with respect to each other and free at their other ends, means for maintaining an electric contact between the abutted ends, contacts carried by the free ends of said strips, fixed contacts complemental to the first mentioned contacts a thermostat positively connected with one of said strips in such manner as to move it toward and from one of said contacts, and to move the other strip away from the other fixed contact, and electro-magnetic means for holding the last mentioned strip in temporary engagement with said fixed contact during return movement of the thermostatically connected member toward its fixed contact.

ROBERT J. PARSONS.
ERNEST J. HEYMAN.